(12) United States Patent
McGill (10) Patent No.: US 10,597,258 B2
(45) Date of Patent: Mar. 24, 2020

(54) STAIRLIFTS

(71) Applicant: Stannah Stairlifts Limited, Hampshire (GB)

(72) Inventor: Matthew Richard McGill, Southampton (GB)

(73) Assignee: Stannah Stairlifts Limited, Hampshire (GB)

( * ) Notice: Subject to any disclaimer, the term of this patent is extended or adjusted under 35 U.S.C. 154(b) by 608 days.

(21) Appl. No.: 15/101,070

(22) PCT Filed: Nov. 24, 2014

(86) PCT No.: PCT/GB2014/053458
§ 371 (c)(1),
(2) Date: Jun. 2, 2016

(87) PCT Pub. No.: WO2015/082875
PCT Pub. Date: Jun. 11, 2015

(65) Prior Publication Data
US 2016/0304318 A1      Oct. 20, 2016

(30) Foreign Application Priority Data

Dec. 3, 2013 (GB) .................................. 1321337.6

(51) Int. Cl.
*B66B 9/08*        (2006.01)
*F16B 7/04*        (2006.01)
(52) U.S. Cl.
CPC ............ *B66B 9/0846* (2013.01); *F16B 7/042* (2013.01); *Y10T 403/55* (2015.01)
(58) Field of Classification Search
CPC ........... B66B 9/0846; B66B 2009/0876; F16B 7/042; F16B 7/182; E04F 11/1808; E04F 11/1836; E04G 7/20; Y10T 403/55; Y10T 403/642; Y10T 403/645; Y10T 403/7018
USPC ............... 403/292, 355, 336, 337; 256/65.15
See application file for complete search history.

(56) References Cited

U.S. PATENT DOCUMENTS

| | | | | |
|---|---|---|---|---|
| 2,997,317 A | * | 8/1961 | Scott | ......................... E04G 7/20 285/397 |
| 3,386,218 A | * | 6/1968 | Scott | ..................... E04B 1/6803 52/309.11 |
| 3,390,906 A | * | 7/1968 | Wing | ..................... F16B 31/021 403/11 |
| 3,883,258 A | * | 5/1975 | Hewson | .................. F16B 12/24 403/292 |

(Continued)

FOREIGN PATENT DOCUMENTS

| | | |
|---|---|---|
| CN | 202245629 U | 5/2012 |
| EP | 0 809 599 | 12/1997 |

(Continued)

OTHER PUBLICATIONS

Search Report issued in co-pending internatioanal application No. PCT/GB2014/053458, dated Feb. 26, 2015.

*Primary Examiner* — John Skroupa
(74) *Attorney, Agent, or Firm* — Dinsmore & Shohl LLP (57) ABSTRACT

A method of forming a stairlift rail from individual tubular sections. Juxtaposed sections are joined using an internal joint, the internal joint and the tubular sections being provided with complimentary locking surfaces that can be manipulated from outside the rail to lock the rail sections together.

17 Claims, 6 Drawing Sheets

(56) References Cited

U.S. PATENT DOCUMENTS

| | | | | |
|---|---|---|---|---|
| 3,889,315 A * | 6/1975 | Stouffer | ............... | E05D 1/04 16/371 |
| 3,966,339 A * | 6/1976 | Nemecek | ............... | F16B 12/24 403/292 |
| 4,767,232 A * | 8/1988 | Francis | ............... | E04F 11/1834 256/67 |
| 4,840,390 A * | 6/1989 | Lockard | ............... | A61G 5/00 280/250.1 |
| 4,932,807 A * | 6/1990 | Rhodes | ............... | B64G 1/222 403/146 |
| 5,078,534 A * | 1/1992 | White | ............... | F16B 7/042 403/292 |
| 5,083,883 A * | 1/1992 | Ueda | ............... | B25G 3/26 403/316 |
| 5,255,993 A * | 10/1993 | Kovacs | ............... | F16B 7/042 403/316 |
| 5,720,144 A * | 2/1998 | Knudson | ............... | E04C 3/07 29/416 |
| 5,860,265 A * | 1/1999 | Knudson | ............... | E04C 3/07 29/509 |
| 5,938,274 A * | 8/1999 | Ehrlich | ............... | B62D 29/045 296/181.3 |
| 6,676,326 B2 * | 1/2004 | Wu | ............... | F16B 7/042 403/109.3 |
| 6,866,253 B1 * | 3/2005 | Hopper | ............... | A01K 3/00 256/10 |
| 7,143,988 B2 * | 12/2006 | Blateri | ............... | F16B 7/182 248/343 |
| 7,524,130 B2 * | 4/2009 | Zenda | ............... | F16B 7/18 403/292 |
| 7,641,180 B2 * | 1/2010 | Adderton | ............... | B63B 17/04 256/65.08 |
| 8,371,768 B1 * | 2/2013 | Wu | ............... | F16B 7/042 403/292 |
| 9,688,514 B2 * | 6/2017 | Horton | ............... | B66B 9/0846 |
| 2003/0164488 A1 * | 9/2003 | Terrels | ............... | E04F 11/002 256/65.15 |
| 2006/0115324 A1 * | 6/2006 | Zenda | ............... | F16B 7/18 403/292 |
| 2010/0096217 A1 * | 4/2010 | Feldhaus | ............... | E06C 7/48 182/214 |
| 2013/0236237 A1 * | 9/2013 | Schmidt | ............... | F16B 7/042 403/109.3 |
| 2016/0146238 A1 * | 5/2016 | Krupinski | ............... | F16B 7/0413 403/292 |
| 2017/0158464 A1 * | 6/2017 | De Kroon | ............... | B66B 9/0838 |
| 2017/0241461 A1 * | 8/2017 | Bally | ............... | A61G 7/0503 |

FOREIGN PATENT DOCUMENTS

| | | | | |
|---|---|---|---|---|
| EP | 1940718 | | 7/2008 | |
| FR | 980584 A | * | 5/1951 | ............... E04G 7/20 |
| FR | 1175966 A | * | 4/1959 | ............... E04G 7/20 |
| FR | 1367425 | | 7/1964 | |
| FR | 2414655 A1 | * | 8/1979 | ............... F16B 7/0413 |
| FR | 2428166 A1 | * | 1/1980 | ............... E04G 7/20 |
| FR | 2468022 A1 | * | 4/1981 | ............... E04G 7/20 |
| FR | 2558218 A1 | * | 7/1985 | ............... E04G 7/20 |
| FR | 2570136 A1 | * | 3/1986 | ............... E04G 7/20 |
| GB | 686249 A | * | 1/1953 | ............... E04G 7/20 |

* cited by examiner

FIG. 13

STAIRLIFTS

CROSS-REFERENCE TO RELATED APPLICATIONS

This application is the U.S. national phase of international application serial No. PCT/GB2014/053458, filed Nov. 24, 2014, which claims the benefit of international application serial No. GB 1321337.6, filed Dec. 3, 2013, the contents of which are incorporated herein in their entirety.

FIELD OF THE INVENTION

This invention relates to a stairlifts and, in particular, to a method of forming a stairlift rail from multiple tubular sections, and/or a stairlift rail formed thereby.

BACKGROUND TO THE INVENTION

A stairlift comprises a rail which in use is attached to a stairway; a carriage which is mounted on the rail for movement along the rail; and a chair mounted on the carriage on which a user sits while completing his/her journey.

The rail should fit the contours of the stairway as closely as possible so as to protrude into the stairway to the least possible extent. However there is an increasing demand for rails to be configured from a selection of standard rail components, and to be easily disassembled for re-use after an existing installation is no longer required. This means that the components that form the rail must be capable of being securely fixed together for use; but equally capable of being disassembled without damage.

One example of stairlift rail is formed from sections of round tube joined end-to-end. Each section has a flange or tang extending from the surface of the tube, the tangs of all the rail sections combining and being adapted to provide a drive surface for a pinion on the output shaft of a motor/gearbox unit mounted within the carriage. It is important that, when the rail is assembled, the sections of rail remain in the correct relative rotational position so that tangs of juxtaposed rail sections remain in alignment. Correct alignment of the tangs not only ensures the structural integrity of the rail as a whole, but is also necessary to maintain ride quality.

In the past, juxtaposed rail sections of this type have typically been held together by a split tubular internal spigot that is expanded to frictionally engage the inner surfaces of the tube sections. However, over time and when subjected to cycles of torque applied as the carriage moves up and down the rail, these frictional joints can loosen.

It is an object of the present invention to provide a method and/or apparatus for forming a stairlift rail that will go at least some way to addressing the aforementioned drawbacks; or which will at least provide a novel and useful choice.

SUMMARY OF THE INVENTION

In one aspect the invention provides a method of joining together tubular sections of a stairlift rail, said method including:
forming an first locking surface in each tubular section such that each said locking surface is accessible from within the tubular section;
mounting an internal joint between juxtaposed tubular sections, wherein each internal joint carries second locking surfaces complimentary to, and engageable with the first locking surfaces on said juxtaposed tubular sections; and
from a position external to said tubular sections, engaging said first and said second locking surfaces.

Preferably said method comprises frictionally engaging said internal joint with internal surface parts of said tubular sections while engaging said first and said second locking surfaces.

Preferably said internal joint includes a further tubular member, said method comprising engaging said first and said second locking surfaces in the region of one end of a diameter of said further tubular member and frictionally engaging said further tubular member with inner surface parts of said tubular sections in the region of the opposite end of said diameter.

In a second aspect the invention comprises a stairlift rail formed from a plurality of tubular rail sections wherein:
each tubular section has a first locking surface formed therein such that said first locking surface is accessible from within the tubular section;
an internal joint is provided between juxtaposed tubular sections, each internal joint carrying second locking surfaces complimentary to, and engageable with the first locking surfaces on said juxtaposed tubular sections; and wherein said tubular sections and said internal joint are configured to allow said first and said second locking surfaces to be engaged from positions external to said tubular sections.

Preferably said internal joint is configured to frictionally engage internal surface parts of said tubular sections when said first and second locking surfaces are engaged, Preferably said internal joint includes a further tubular member.

Preferably said second locking surfaces are displaceable substantially along a diameter of said further tubular member.

Preferably said first locking surfaces are defined by one or more holes extending through said tubular members.

Preferably said second locking surfaces are defined by pins displaceable from said internal joint.

Preferably each tubular section has a tang extending from the outer surface thereof such that, when said tubular sections are assembled together, the tangs of juxtaposed sections are aligned.

Preferably each said tang is aligned with a diameter of the corresponding tubular member.

Preferably the diameter along which said second locking surfaces are displaced, is arranged at an angle of between 10° and 40° from the diameter with which said tang is aligned. More preferably said angle is substantially 30°.

In a third aspect the invention provides method of joining together tubular sections of a stairlift rail wherein each section of said rail includes a tang projecting from an outer surface thereof, said tang having a plurality of apertures extending along said tang; and wherein the tangs of juxtaposed sections have overlapping parts, each of said overlapping parts having a hole there-through such when sections of rail are engaged in juxtaposition the holes are arranged co-axially to define a bore, said method being characterized in that a pin is inserted into said bore so that a distal end of said pin projects out beyond said bore; and said distal end is deformed to prevent withdrawal of said pin from said bore.

Preferably said one of said holes extends from one of said apertures and wherein said method includes generating a displacement force between said pin and an edge defining part of said aperture to drive said pin into said bore.

Preferably said method includes inserting a wedge into said one of said apertures between said edge and said pin, and displacing said wedge so as to drive said pin into said bore.

Preferably said method includes maintaining said pin in position by means of said wedge while deforming the distal end of said pin.

Preferably said method includes using a device provided integrally with said wedge for effecting deformation of the distal end of said pin.

In a fourth aspect the invention provides a stairlift rail formed from a plurality of tubular sections joined together, each section of said rail including a tang projecting from an outer surface thereof, said tang having a plurality of apertures extending along said tang; wherein the tangs of juxtaposed sections have overlapping parts, each of said overlapping parts having a hole there-through such when sections of rail are engaged in juxtaposition the holes on said overlapping are arranged co-axially to define a bore, said rail further including a pin inserted into said bore to join said overlapping parts together said rail being characterized in that:

said pin and/or said bore are configured and arranged so that the insertion of said pin into said bore is restrained to a limit position;

when in said limit position a distal end of said pin projects beyond said bore; and said distal end is deformed to prevent withdrawal of said pin from said bore.

Preferably said pin includes a taper.

Preferably the holes in said overlapping sections differ in diameter.

Preferably said pin includes an axial socket in said distal end.

In a fifth aspect the invention provides a stairlift rail formed from a plurality of tubular sections joined together wherein each of said sections has a tang extending from the outer surface thereof such that when the sections are combined, said tangs combine to provide a drive surface extending along said rail, wherein said sections are joined together using an internal joint as set forth above and wherein said tangs are connected as set forth above.

Many variations in the way the present invention can be performed will present themselves to those skilled in the art. The description which follows is intended as an illustration only of one means of performing the invention and the lack of description of variants or equivalents should not be regarded as limiting. Wherever possible, a description of a specific element should be deemed to include any and all equivalents thereof whether in existence now or in the future.

BRIEF DESCRIPTION OF THE DRAWINGS

The various aspects of the invention will now be described with reference to the accompanying drawings in which.

DETAILED DESCRIPTION OF WORKING EMBODIMENT

The invention provides a method of forming a rail for a stairlift and/or a stairlift rail formed according to the method. In the conventional manner the stairlift includes a carriage (not shown) which, in use, is driven along the rail by a motor and gear box unit mounted within the carriage. Typically a drive pinion is mounted on the output shaft of the gearbox, the assembly being configured so that the pinion engages a drive surface on the rail.

Figure 3:
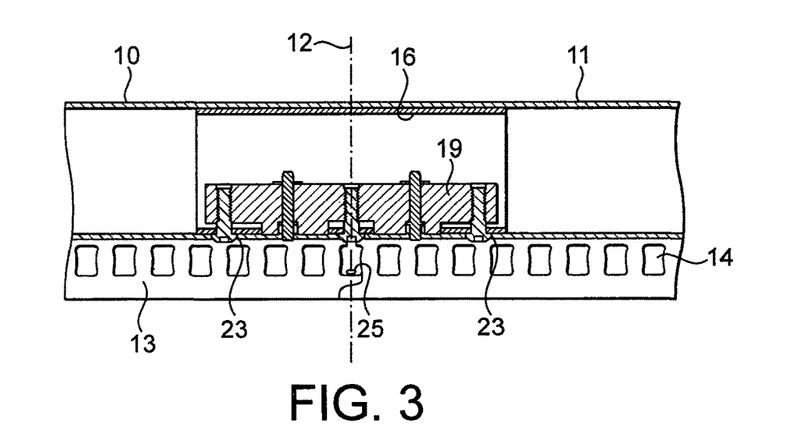
FIG. 3: shows a part-sectional view of the internal joint shown in FIGS. 1 & 2 inserted between two juxtaposed tubular rail sections.

The method disclosed herein has been devised, in particular, to provide a means of forming a stairlift rail from pre-configured tubular rail sections that are assembled together, at an installation site. In FIG. 3 of the attached drawings two juxtaposed tubular rail sections 10 & 11 are depicted which meet at joint axis 12. It will be appreciated, however, that the method and apparatus described for joining the sections 10 & 11 together can be applied to the joining of other rail sections along the entire length of the rail.

The tubular sections 10 and 11 are preferably formed from round-sectioned steel tube and, as shown, each section has a drive flange or tang 13 extending from the outer surface thereof. The tang 13 is planar in form and conveniently aligned along an extension of a diameter of the section to which it is attached. When the tubular sections are all assembled together to form a complete or finished rail, the tang of each section is aligned with the tangs of the sections on both sides thereof. In this way a continuous drive surface is provided along the length of the rail.

The tangs 13 are conveniently formed from steel plate that is preferably welded to the exterior of the tubular sections. Windows or apertures 14 are formed in the tangs to provide drive surfaces for the rail the windows 14, in use, receiving the teeth of the drive pinion (not shown).

Figure 1:
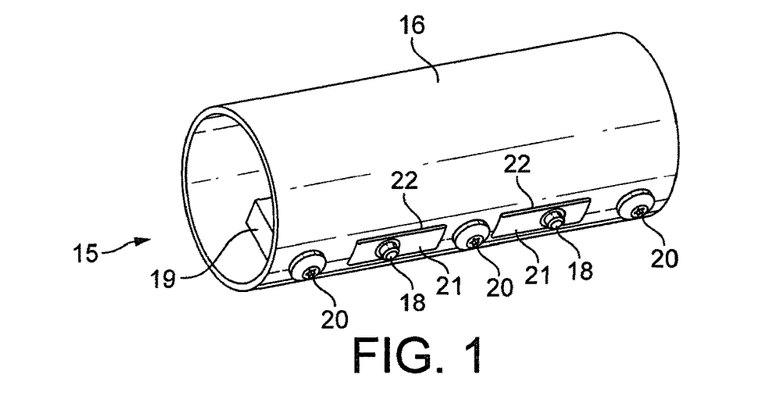
FIG. 1: shows an isometric view of an internal joint forming part of a stairlift rail according to the invention.
Figure 2:
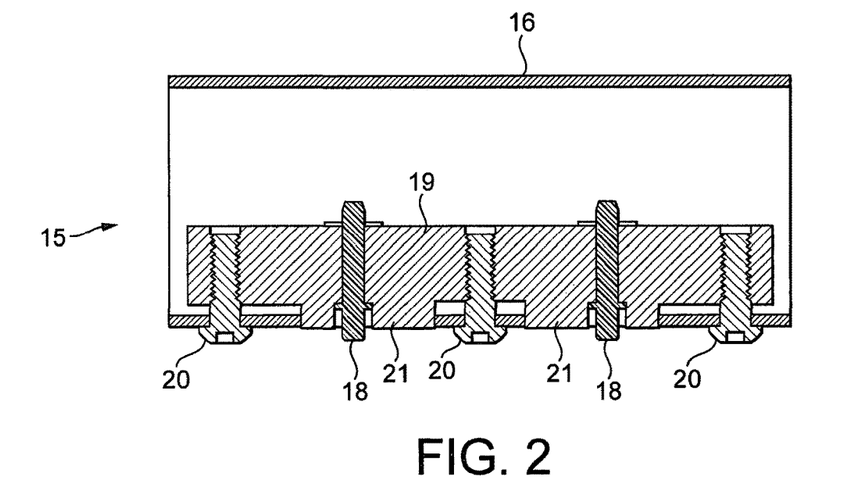
FIG. 2: shows a sectional view of the joint shown in FIG. 1.

The tubular rail sections 10 & 11 are held together, and in alignment, by an internal joint 15 shown in detail in FIGS. 1 & 2. In the form shown the internal joint comprises a length of tube 16 that is sized to fit concentrically and snuggly within the tubular sections 10 & 11. The tubular sections 10 & 11, and the internal joint 15, are provided with co-operating first and second locking surfaces respectively such that, with the tubular rail sections 10 & 11 in the correct rotational alignment and abutted in juxtaposition along joint axis 12, and the internal joint 15 correctly positioned, the first and second locking surfaces can be brought into engagement to lock the sections 10 & 11 together. When so locked together, both axial displacement and relative rotation between the tubular rail sections is positively prevented.

The first locking surfaces are, in the form shown, provided by holes 17 extending through the walls defining the tubular rail sections 10 & 11. The second locking surfaces are provided by pins 18 mounted within the internal joint, the pins 18 being engageable within the holes 17 to lock the tubular rail sections together.

As can best be seen from FIG. 2, the pins 18 are mounted on joint bar 19, the joint bar 19 being held in position within the joint by clamping screws 20 which pass through the wall of the tube 16 and screw into the bar 19. In addition to mounting the pins 18 the bar 19 includes clamping pads 21 that surround the pins 18 and are aligned with slots 22 formed in the wall of the tube 16. Thus, as the clamping screws 20 are tightened, the pads 21 are drawn through the slots 22 causing the pins 18 to project out beyond the surface of the joint 15.

Figure 4:
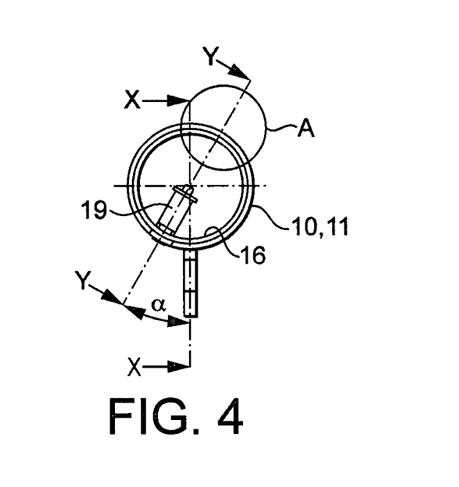
FIG. 4: shows an end view of that which is shown in FIG. 3.

It will be seen from FIG. 4 that the joint bar 19 is mounted for displacement along a diameter of the joint tube 16 and, given that the joint tube 16 is concentric with the tubular rail sections 10 & 11, is also mounted along a diameter of the rail sections. The holes 17 defining the first locking surfaces are preferably formed in the sections 10 & 11 so that, when the first and second locking surfaces are engaged, the diameter along which the joint bar 19 lies—indicated by section Y-Y—is rotationally offset from the axis on which the tang 13 lies—indicated by section X-X in FIG. 4, by angle α. Angle α preferably lies in the range 10-40° and more preferably is about 26°. This arrangement provides a good compromise between providing access to an installer whilst minimizing the visual impact of the components forming the joint. Further, when the clamping screws are tightened, the rail sections 10 & 11 may be deformed to some extent. By arranging any deformation along axis Y-Y, the carriage rollers can readily accommodate this deformation.

It will be appreciated that access holes 23 must be provided through the tubular rail sections to allow access to the clamping screws 20 from positions external to the rail sections. It will be further appreciated that, in order to assemble the internal joint 15 within the rail sections, the outer clamping screws must first be removed from the joint and then passed though the holes 23 once the tubular rail sections have been brought into abutting juxtaposition.

Whilst a single clamping screw 20 could be provided at the centre-line of the internal joint 15, we have found that the provision of three clamping screws 20 allows a more even loading to be applied to the joint. This is important because, as the screws 20 are tightened to draw the pins 18 into engagement with the holes 17, the clamping pads 21 are brought into contact with the interior walls of the tubular sections 10 & 11. Further tightening of the screws 20 then causes the tube 16 to be locked against the tubular rail sections 10 & 11, particularly that part of the tube 16 at the opposite end of the diameter, indicated by region A in FIG. 4. This provides frictional engagement between the joint and the rail sections which supplements the resistance to relative rotation provided by the engagement of pins 18 in holes 17.

In addition to the internal joint 15 described above, juxtaposed tangs are also preferably joined in a manner that will maintain alignment of the tang sections yet allow the rail sections to disassembled at a later date, if necessary.

In the form shown in FIG. 3 the tangs of juxtaposed rail sections are configured in a manner so that parts thereof overlap. A pin is then inserted into aligned holes in the overlapping tang parts to join the tangs together. A particular embodiment of this arrangement is described in greater detail below.

Figure 5:
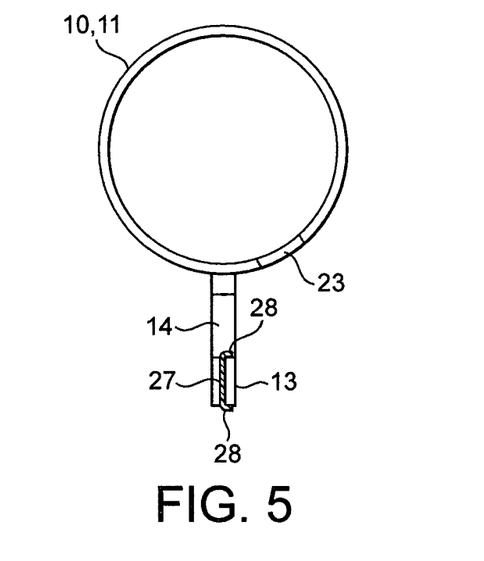
FIG. 5: shows an end view of a tubular rail section illustrating one form of tang connection.
Figure 6:
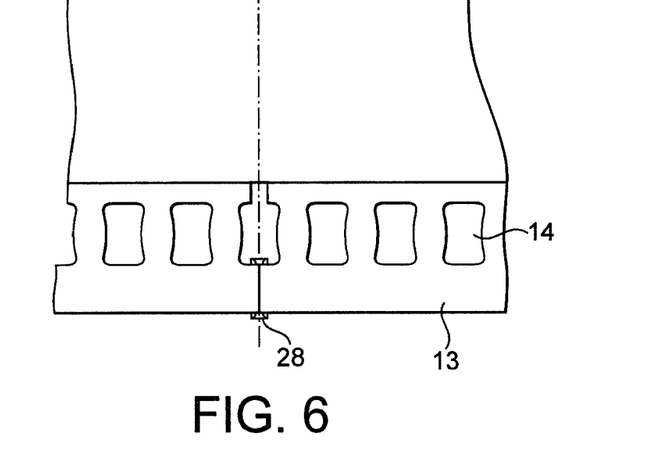
FIG. 6: shows a side view of a joint between juxtaposed rail sections illustrating the tang connection from a different angle.
Figure 7:
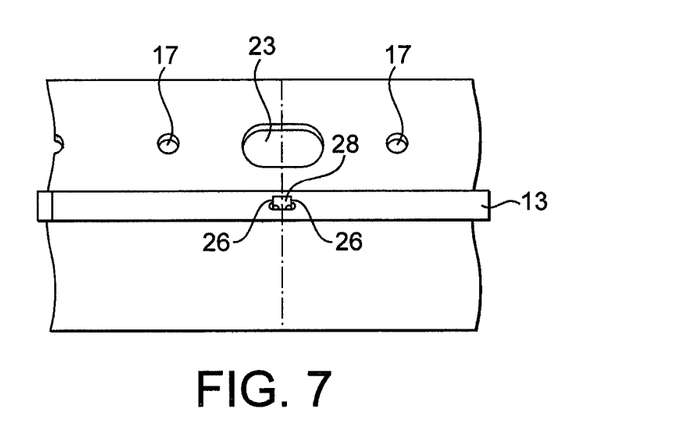
FIG. 7: shows a view from underneath of that which is shown in FIG. 6.

An alternative is shown in FIGS. 5-7. In this embodiment juxtaposed tang edges are provided with aligned slots 26 into which a plate 27 is inserted. The ends 28 of the plate are pre-formed at an angle to the centre, or are folded over to maintain the plate in position.

Figure 8:
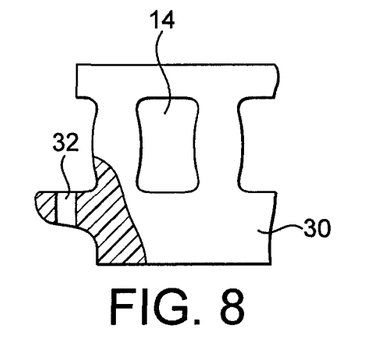
FIG. 8: shows a side view of a first tang part, partly in section, incorporated in a rail joint according to an aspect of the invention.
Figure 9:
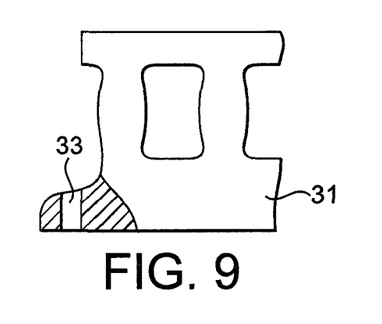
FIG. 9: shows, in reverse and also partly in section, a second tang part for overlapping engagement with the first tang part shown in FIG. 8.

Referring now to FIGS. 8-13, adjacent tang sections may be fouled to overlap, such tang sections comprising an upper tang part 30 as shown in FIG. 8 and a lower tang part 31 as shown in FIG. 9. Upon assembly, as two rail sections are brought into juxtaposition, an upper tang part is overlapped and combined with a lower tang part to form the joint shown in FIGS. 3 & 13. It will be noted that the overlapping joint lies beneath an aperture 14 in the tang.

The upper tang part 30 includes a hole 32 projecting there-through, the axis of hole 32 being substantially perpendicular to the axis of the tubular section to which the tang part is fixed. Similarly the lower tang part includes a hole 33 there-through, the axis of which is arranged substantially perpendicular to the axis of the tubular section to which the respective tang part is fixed. Thus, as the two tang parts are brought into overlapping engagement, the holes 32 & 33 become co-axial and combine to form a bore 34. It will be seen that the bore 34 extends downwardly from an aperture 14 in the tang and is sized to receive a joint pin 35 to complete the joint. A feature of the holes 32 and 33 is that the diameter of hole 32 is larger than that of hole 33. By way of example, the hole 32 may be 4.2 mm in diameter whilst the hole 33 may be 4.0 mm in diameter. Thus the bore 34 effectively tapers.

Figure 10:
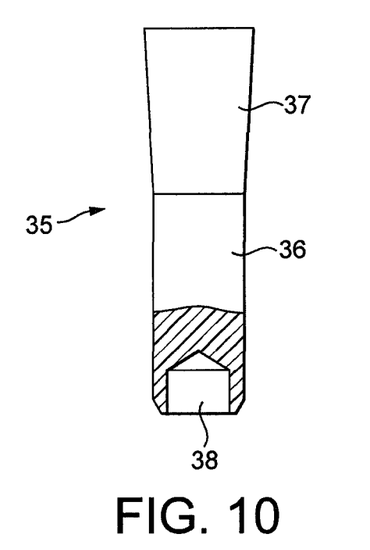
FIG. 10: shows, in an enlarged scale and partly in section, a pin for connecting the tang parts shown in FIGS. 8 & 9.

As shown in FIG. 10, the joint pin 35 has a lower section 36 of uniform cross section and an upper section 37 which tapers inwardly to the lower section 36. The distal end of the lower section is formed with an axial socket 38. The pin 35 is sized to be an interference fit within the bore 34, the combination of the reduced diameter of lower hole 33 and the tapered upper section of the pin 35 serving to limit the insertion of the pin 35 into the bore 34.

Figure 11A:
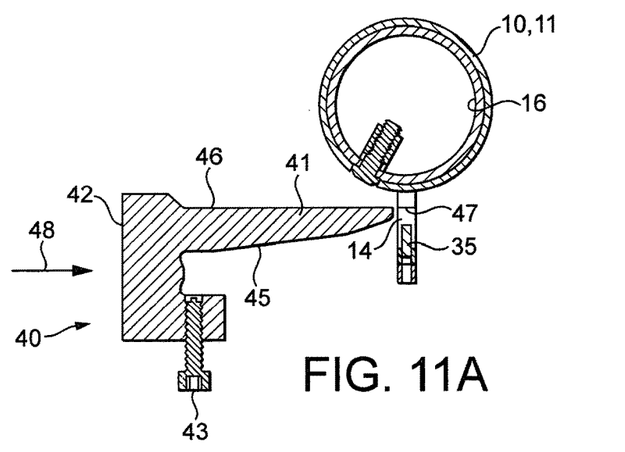
FIGS. 11A to 11C show a sequence of sectional views of the pin shown in FIG. 10 being engaged with the overlapped tang parts shown in FIGS. 8 & 9.
Figure 11B:
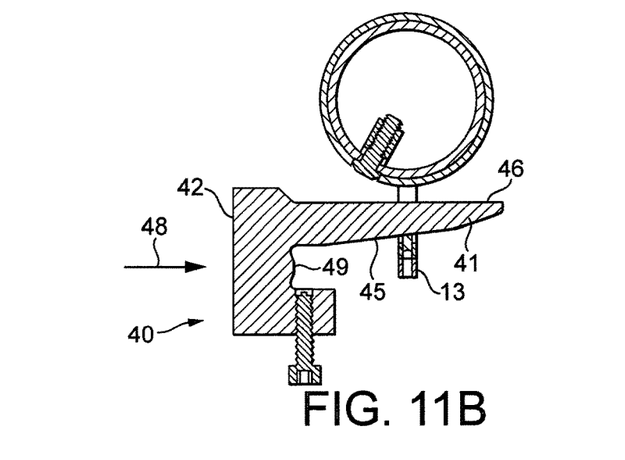
Figure 11C:
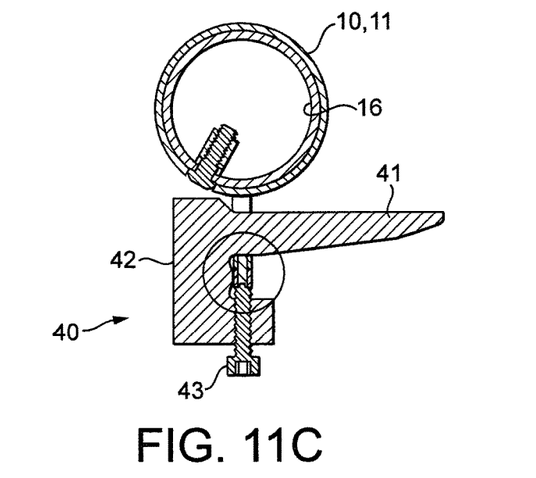

Turning now to FIGS. 11A-11c, in order to positively drive the joint pin 35 into the bore 34, tool 40 is preferably employed. Such a tool has the advantage that significant axial force can be applied to the pin in a very confined space. In the form shown, the tool 40 includes a wedge section 41, a base 42, and a deforming device 43.

To start the pin insertion sequence, the distal end of pin 35 is offered up to the upper entrance of hole 32. Because the lower section 36 of the pin is smaller in diameter than the diameter of hole 32, the pin can be partially inserted into the bore 34. As the wedge section 41 is introduced into the aperture 14 from which the bore 34 extends, the lower surface 45 of the wedge section contacts the upper end of the pin 35 whilst the upper surface 46 of the wedge section contacts the edge 47 of the aperture that is opposite to the edge containing bore 34. Thereafter, as the tool 40 is displaced in the direction of arrow 48, the expanding taper of the wedge section 41 causes the pin 35 to be driven into the bore 34 and, thereby, causes the tapered section of the pin 35 to be driven downwardly against the reducing diameter of the bore 34.

The displacement of tool 40 in the direction of arrow 48 is continued until, as shown in FIG. 11C, abutment surface 49 on the tool contacts the surface of tang 13. The tool 40 is configured so that, when this position is reached, the pin 35 is fully displaced into a limit position in bore 34, the distal end of the pin projects below the lower edge of the tang, and the deforming device 43 is positioned adjacent to the projecting part of the pin 35.

Figure 12:
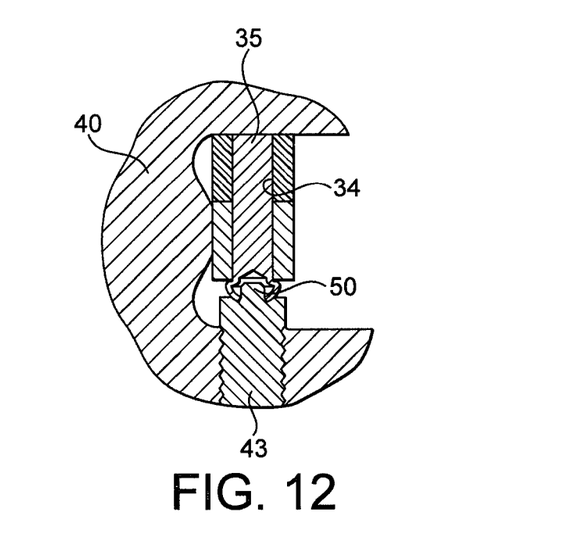
FIG. 12: shows in a larger scale the area circled in FIG. 11C.
Figure 13:
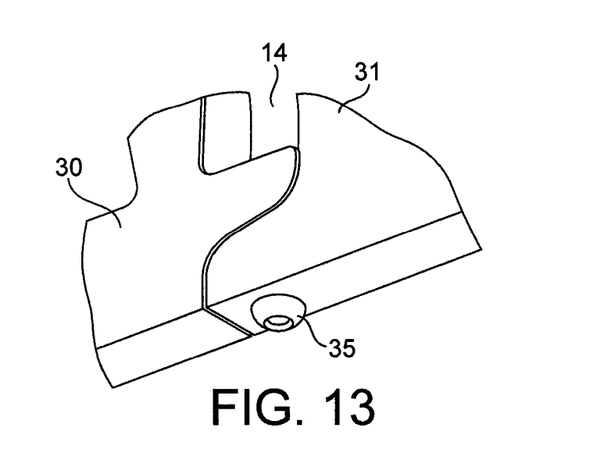
FIG. 13: shows an isometric view, from below, of a completed joint formed by a combination of the components shown in FIGS. 8 to 10.

In the form shown, the deforming device comprises a screw having a distal end 50 shaped to locate within socket 38 provided in the end of the pin. As illustrated in FIG. 12, as the screw 43 is would upwardly, the end 50 engages within the socket 38 and deforms the end of the pin outwardly. The end of the pin 35, following deformation, is shown in FIG. 13. When so deformed the pin 35 is restrained against removal from the bore 34 yet, if the rail is to be disassembled, a suitable tool can be readily located within the end of the pin to effect removal.

Thus the invention provides a method of joining tubular stairlift rail components together that provides positive anchoring against relative rotation between juxtaposed sections, confines the joint components completely within the rail yet allows the rail to be readily formed and disassembled as required.

The invention claimed is:

1. A method of joining together tubular rail sections of a stairlift rail, said method comprising:
    forming a first locking surface in each tubular rail section such that each said locking surface is accessible from within the tubular section, said locking surfaces being by holes extending through the walls defining the tubular rail sections;
    mounting an internal joint, said internal joint comprising a length of tube, concentrically between juxtaposed tubular rail sections, the internal joint carries second locking surfaces provided by pins complementary to, and engageable with the first locking surfaces on said juxtaposed tubular rail sections, said pins being mounted within said internal joint on a bar and being engageable within said holes to lock said tubular rail sections together;
    holding said tubular rail sections together, and in alignment, by said internal joint;
    positioning said first and second locking surfaces so that said tubular rail sections can be brought into engagement;
    positioning clamping screws through a wall of the tube and screwing into the bar such that the bar is held in position within the tube;
    from a position external to said tubular rail sections, tightening the clamping screws to cause displacement of said second locking surfaces into engagement with said first locking surfaces to positively prevent axial displacement and relative rotation between said tubular sections; and
    frictionally engaging said internal joint with internal surface parts of said tubular sections while engaging said first and said second locking surfaces.

2. The method as claimed in claim 1, wherein said internal joint includes a further tubular member, said method further comprising engaging said first and said second locking surfaces in the region of one end of a diameter of said further tubular member and frictionally engaging said further tubular member with inner surface parts of said tubular sections in the region of the opposite end of said diameter.

3. A stairlift rail comprising:
    a plurality of tubular rail sections, each tubular rail section having a hole formed therein defining a first locking surface such that said first locking surface is accessible from within the tubular rail section;
    an internal joint comprising a length of tube sized to fit concentrically between juxtaposed and rotationally aligned tubular rail sections, the internal joint carrying second locking surfaces provided by pins complementary to, and engageable with the first locking surfaces on said juxtaposed tubular rail sections, said pins mounted within the internal joint on a bar and engageable within said holes to lock said tubular rail sections together, wherein the bar is held in position within the tube by clamping screws which pass through a wall of the tube and screw into the bar, said internal joint being configured to frictionally engage internal surface parts of said tubular rail sections when said first and second locking surfaces are engaged; and
    said tubular rail sections and said internal joint being configured to allow said second locking surfaces to be displaced into engagement with said first locking surfaces from positions external to said tubular rail sections through tightening of the clamping screws and when said first and second locking surfaces are engaged, axial displacement and relative rotation between said tubular rail sections is positively prevented.

4. The stairlift rail as claimed in claim 3 wherein said second locking surfaces are displaceable substantially along a diameter of said internal joint.

5. The stairlift rail as claimed in claim 3, wherein each tubular rail section has a tang extending from the outer surface thereof such that, when said tubular rail sections are assembled together, the tangs of juxtaposed sections are aligned.

6. The stairlift rail as claimed in claim 5, wherein each said tang is aligned with a diameter of the corresponding tubular member.

7. The stairlift rail as claimed in claim 6, wherein the diameter along which said second locking surfaces are displaced, is arranged at an angle of between 10° and 40° from the diameter with which said tang is aligned.

8. The stairlift rail as claimed in claim 7, wherein said angle is substantially 30°.

9. A method of joining together tubular rail sections of a stairlift rail wherein each section of said tubular rail includes a tang projecting from an outer surface thereof, said tang having a plurality of apertures extending along said tang; and wherein the tangs of juxtaposed sections have overlapping parts, each of said overlapping parts having a hole there-through such when sections of tubular rail are engaged in juxtaposition the holes are arranged co-axially to define a bore, said method comprising:
    inserting a tapered pin into said bore so that a distal end of said tapered pin projects out beyond said bore, the tapered pin and the bore being configured such that the tapered pin and the bore cooperate to define a limit position of the tapered pin, the insertion of the tapered pin into the bore from one of the plurality of apertures is restrained to the limit position such that the tapered pin does not extend into the one of the plurality of apertures; and
    deforming said distal end to restrain and to prevent withdrawal of said tapered pin from said bore and into one of the plurality of apertures.

10. The method as claimed in claim 9, wherein said one of said holes extends from one of said apertures and wherein said method includes generating a displacement force between said tapered pin and an edge defining part of said aperture to drive said tapered pin into said bore.

11. The method as claimed in claim 10, further comprising inserting a wedge into said one of said apertures between said edge and said tapered pin, and displacing said wedge so as to drive said tapered pin into said bore.

12. The method as claimed in claim 11, further comprising maintaining said tapered pin in position by means of said wedge while deforming the distal end of said tapered pin.

13. The method as claimed in claim 11, further comprising including using a device provided integrally with said wedge for effecting deformation of the distal end of said tapered pin.

14. The method as claimed in claim 9, wherein the holes defining the bore in said overlapping parts differ in diameter, thereby providing a tapered bore, and the tapered bore and the taper of the pin combine to define the limit position.

15. A stairlift rail comprising:
a plurality of tubular rail sections joined together, each section of said tubular rail including a tang projecting from an outer surface thereof, said tang having a plurality of apertures extending along said tang; wherein the tangs of juxtaposed sections have overlapping parts, which when combined define one of said apertures, each of said overlapping parts having a hole there-through such that when sections of tubular rail are engaged in juxtaposition the holes on said overlapping parts are arranged co-axially to define a bore;
a pin inserted into said bore to join said overlapping parts together;
said pin being tapered and said bore being configured such that the tapered pin and the bore cooperate to define a limit position of the tapered pin, the insertion of said tapered pin into said bore from one of said plurality of apertures is restrained to the limit position such that said tapered pin does not extend into the one of said plurality of apertures;
when in said limit position, a distal end of said tapered pin projecting beyond said bore; and
said distal end being deformed to restrain and to prevent withdrawal of said tapered pin from said bore and into one of said plurality of apertures.

16. The stairlift rail as claimed in claim 15, wherein the holes in said overlapping sections differ in diameter, thereby providing a tapered bore, said tapered bore and said taper of said pin combine to define said limit position.

17. The stairlift rail as claimed in claim 15, wherein said pin includes an axial socket in said distal end.

* * * * *